J. W. Currier.
Sap-Bucket.

Nº 76168. Patented Mar. 31, 1868.

Witnesses:
W. Morris Smith
Sydney E. Smith

Inventor:
J. W. Currier
Attorneys:
Brown, Coombs &c.

United States Patent Office.

J. W. CURRIER, OF NEWBURY, VERMONT.

*Letters Patent No. 76,168, dated March 31, 1868*

IMPROVEMENT IN SAP-BUCKETS.

*The Schedule referred to in these Letters Patent and making part of the same.*

TO ALL WHOM IT MAY CONCERN:

Be it known that I, J. W. CURRIER, of Newbury, in Orange county, and State of Vermont, have invented a new and useful Improvement in "Sap-Buckets;" and I do hereby declare that the following is a full, clear, and exact description thereof, reference being had to the accompanying drawings, through letters of reference marked thereon, forming part of this specification, in which—

Figure 1:
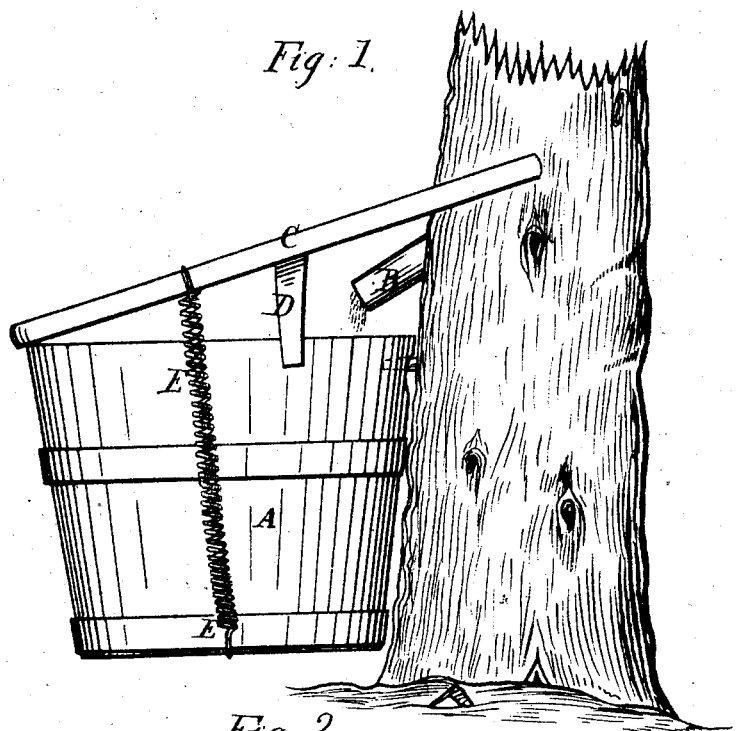
Figure 1 represents a bucket, as applied to a tree for the purpose of catching the sap, with my improvement attached.

In tapping maple and other trees to obtain the saccharine and other juices, for the purpose of extracting the sugar, &c., therefrom, it is usual to do so early in the season, before the sap begins to rise, and at such season the rigor and severity of the winter have not entirely subsided, but frequently snow storms and rains are experienced after vegetation has commenced, in which case, the ordinary open bucket, suspended on the tree, will become filled with snow or rain, which must of necessity be evaporated before the pure sap can be condensed to a solid state.

The object of my invention is to provide a shield or cover to the bucket, supported on and connected therewith in such manner that whilst it will shed all the falling snow or rain, the bucket may be perfectly accessible for examination, or discharging its contents, without detaching the cover.

To enable others to make and use my invention, I will proceed to describe it by referring to the drawing, in which the same letter, appearing in the several figures, indicates the same part.

Figure 2:
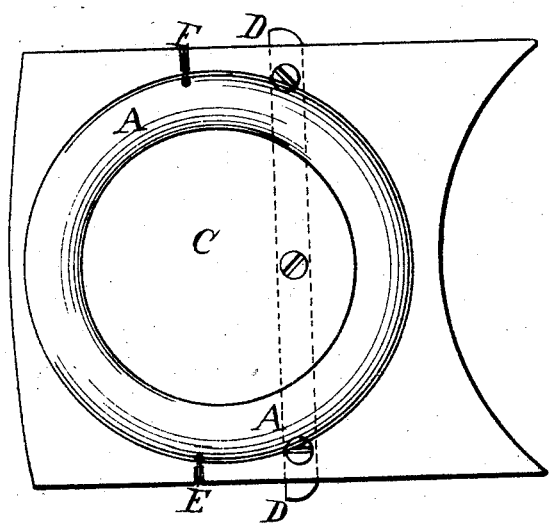
Figure 2 represents a top view of the same, the bucket being shown in red outline.
Figure 3:
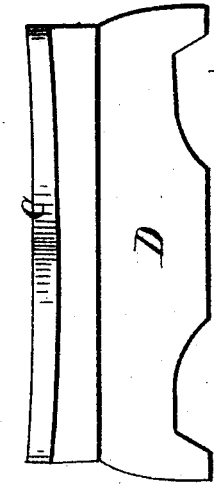
Figure 3 is a view of my improved attachment from the tree-side.

A represents an ordinary or any suitable bucket suspended on the side of a tree in any convenient manner. A few inches above the upper edge of the bucket, the tree is tapped, by driving into it a suitable spile, B, for drawing therefrom the sap, as it rises in the spring of the year, and causing it to flow into the bucket. On the top of the bucket I provide a cover, C, arranged on an incline, resting on the edge of the bucket at its lower or outer edge, and supported, at about two-thirds of the diameter of the bucket therefrom, by a bridge, D, secured to its under side, and suitably formed on its lower edge to rest upon the edges of the bucket, without liability of slipping to either side. The upper or inner edge of this cover C is curved, inwardly or concave, as shown in fig. 2, to such an extent as to fit the average diameter of trees to which it may be desired to apply it. This cover is then connected with the bucket by spiral or other suitable springs E, attached to the edge of the cover at a suitable point between the outer edge of the bucket and the bridge D, the lower ends of these springs extending to and hooking on to the lower edge of the bucket-staves, or on to studs, suitably arranged on the sides of said bucket. It is obvious that any other suitable style of spring may be substituted for that represented, and be attached by studs, staples, or other convenient means.

In using this device, the tree is tapped, and the bucket suspended thereto in the usual or any convenient manner. The cover C is then applied, with its outer edge resting upon the edge of the bucket, its inner concave edge fitting, as near as may be, around the side of the tree, and its bridge D resting on the edge of the bucket. When in this position the springs E are drawn down, and hooked on the bottom of the bucket or other device provided for that purpose.

On examining the contents of the bucket, the cover C may be pulled slightly away from the tree, and its lower edge be raised, using the bridge D as a fulcrum, thus affording ample space for inspection, or for baling out the bucket, if desired, without removing it from the tree. This cover will effectually protect the bucket from the entrance of snow or rain, and against the interference of animals.

Having thus described my invention, what I claim as new, and desire to secure by Letters Patent, is—

The cover C, provided with a bridge or support, D, and springs E, for attachment to a bucket, all arranged, combined, and operating substantially as shown and described, for the purpose set forth.

In testimony whereof, I hereunto set my name in presence of two subscribing witnesses, this 18th day of February, 1868.

J. W. CURRIER.

Witnesses:
 HUGH DONNELLY,
 JAMES KIRKHAM.